United States Patent [19]

Escher et al.

[11] Patent Number: 5,206,751

[45] Date of Patent: Apr. 27, 1993

[54] PROCESS FOR THE PRODUCTION OF AN IMPACT-RESISTANT LIQUID CRYSTAL SWITCHING AND DISPLAY DEVICE

[75] Inventors: Claus Escher, Mühltal; Gerhard Illian; Norbert Rösch, both of Frankfurt am Main, all of Fed. Rep. of Germany; Takamasa Harada, Inzai, Japan

[73] Assignee: Hoechst Aktiengesellschaft, Frankfurt am Main, Fed. Rep. of Germany

[21] Appl. No.: 683,325

[22] Filed: Apr. 10, 1991

[30] Foreign Application Priority Data

Apr. 12, 1990 [DE] Fed. Rep. of Germany ....... 4011805

[51] Int. Cl.$^5$ .................. G02F 1/13; C09K 19/52; C09K 19/54; C09K 19/56
[52] U.S. Cl. .................. 359/100; 359/104; 252/299.01; 252/299.4; 252/299.5
[58] Field of Search .................. 359/104, 100; 252/299.4, 299.5, 299.01

[56] References Cited

U.S. PATENT DOCUMENTS 4,077,900 3/1978 Pohl et al. .................. 359/103

FOREIGN PATENT DOCUMENTS 0429662 6/1991 European Pat. Off. .
9108272 6/1991 World Int. Prop. O. .

OTHER PUBLICATIONS

Dübal et al., "Electro-Optical Behaviour of Ferroelectric Liquid Crystal (FLC) Mixtures", Proceedings of the 6th International Symposium on Electrets, Oxford, England (1988).
Sato et al., "High Quality Ferroelectric Liquid Crystal Display with Quasi-Bookshelf Layer Structure", Japanese Journal of Applied Physics, vol. 28, No. 3, Mar. 1989, pp. 483-486.

Primary Examiner—William L. Sikes
Assistant Examiner—Anita Pellman Gross
Attorney, Agent, or Firm—Curtis, Morris & Safford

[57] ABSTRACT

Addition of coronands and cryptands to FLC-mixtures makes it possible to bring the FLC material into a homogeneous "bookshelf" or "quasi-bookshelf" geometry. When such a FLC mixture is used, displays which have been shock-damaged can be regenerated by applying a suitable electric field for a short period of time.

9 Claims, 11 Drawing Sheets

FIG. 3a(a1)
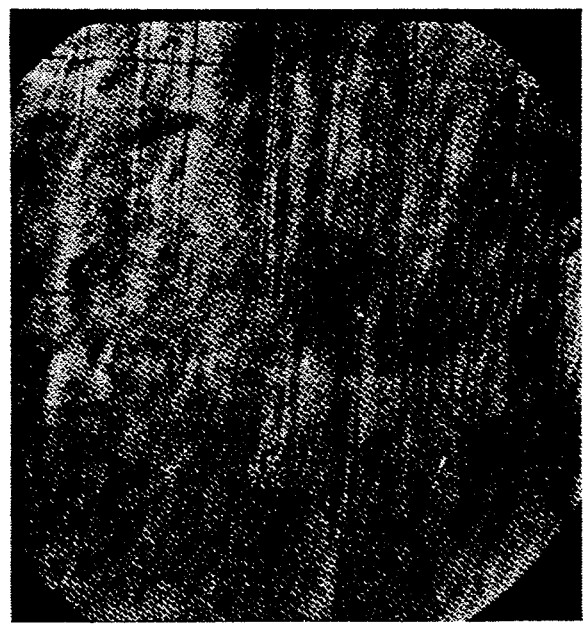
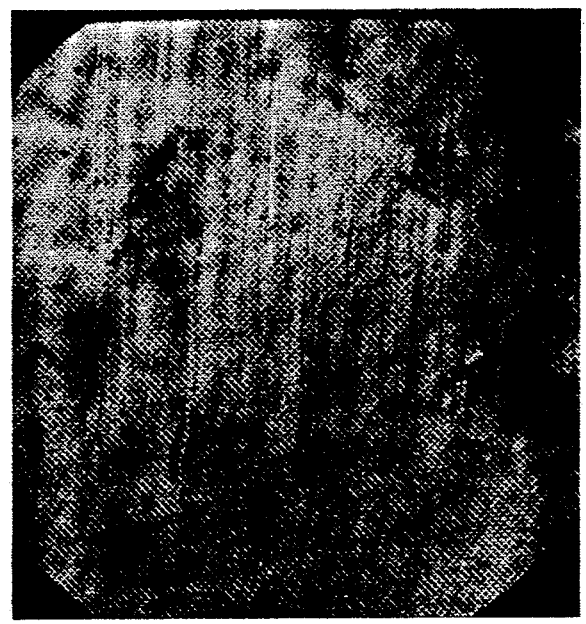
FIG. 3a(a2)

FIG. 3a(a3)
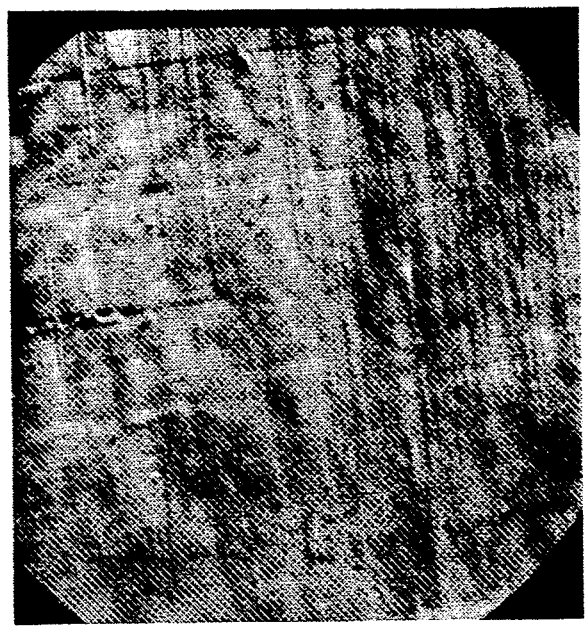
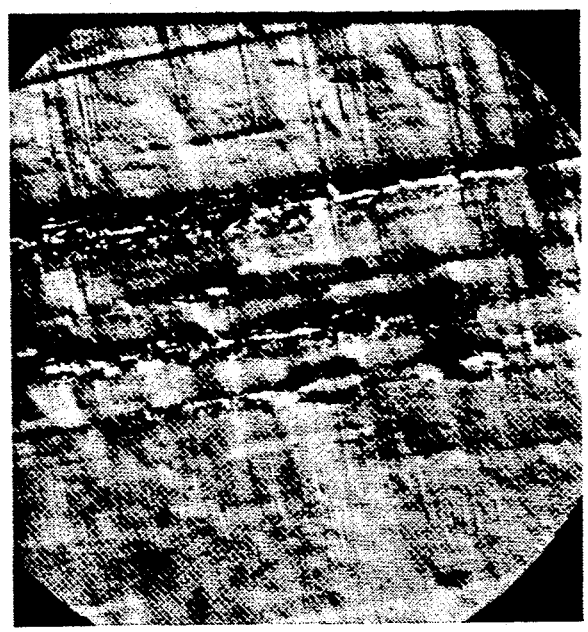
FIG. 3a(a4)

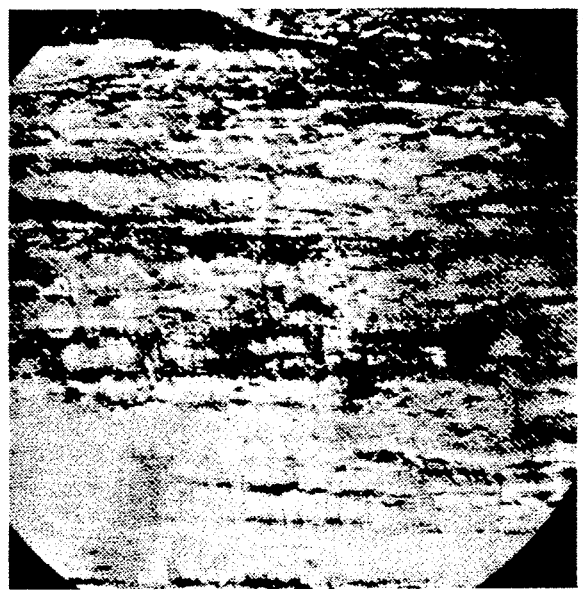
FIG. 3a (a5)

FIG. 3b(b1)
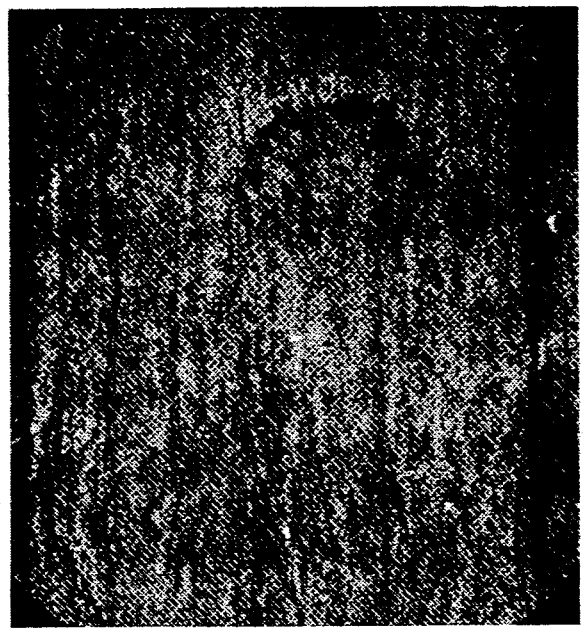
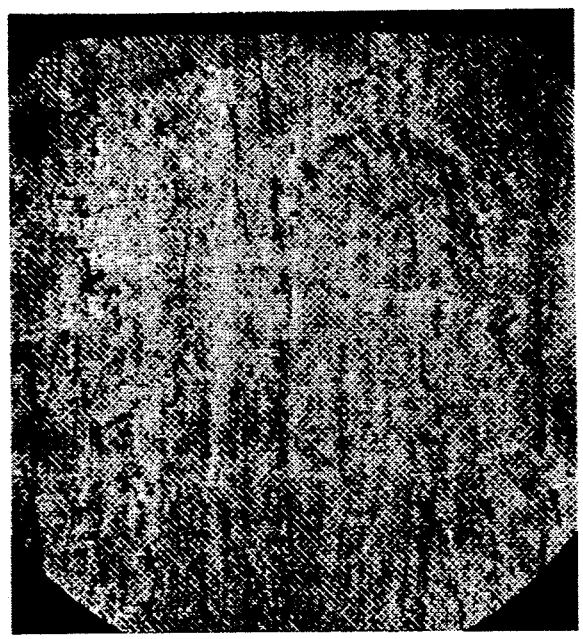
FIG. 3b(b2)

FIG. 3b(b3)
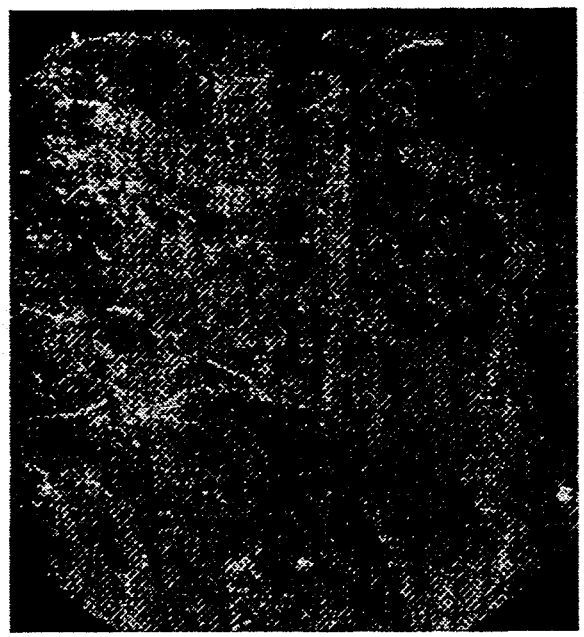
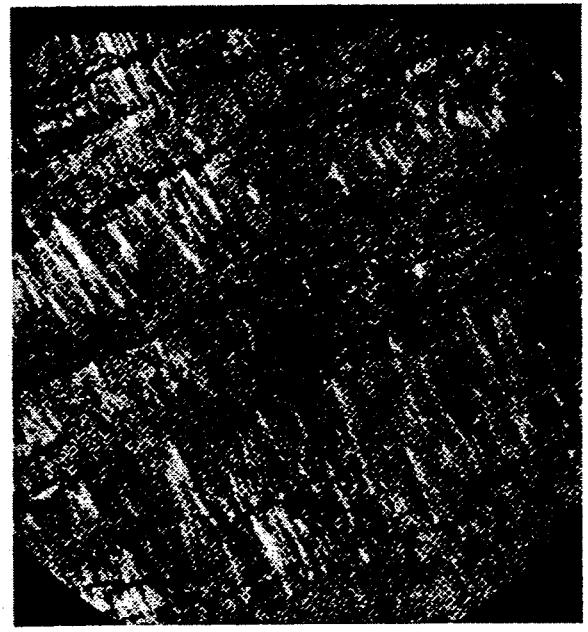
FIG. 3b(b4)

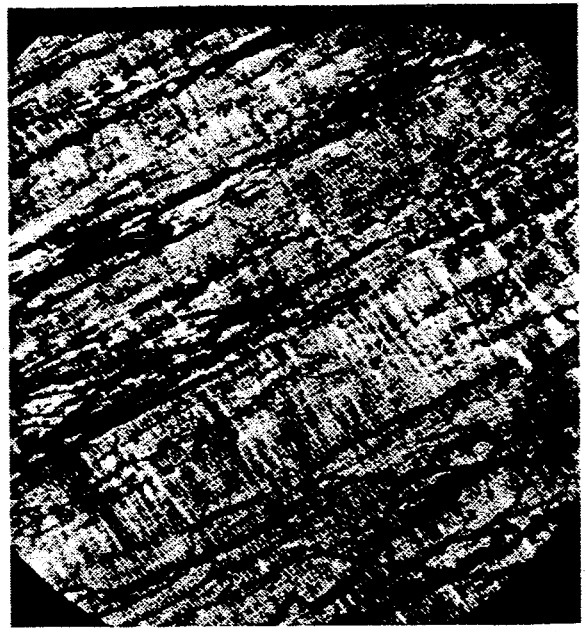
FIG. 3b(b5)

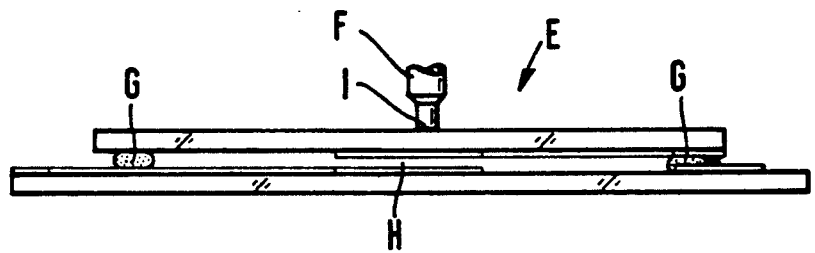
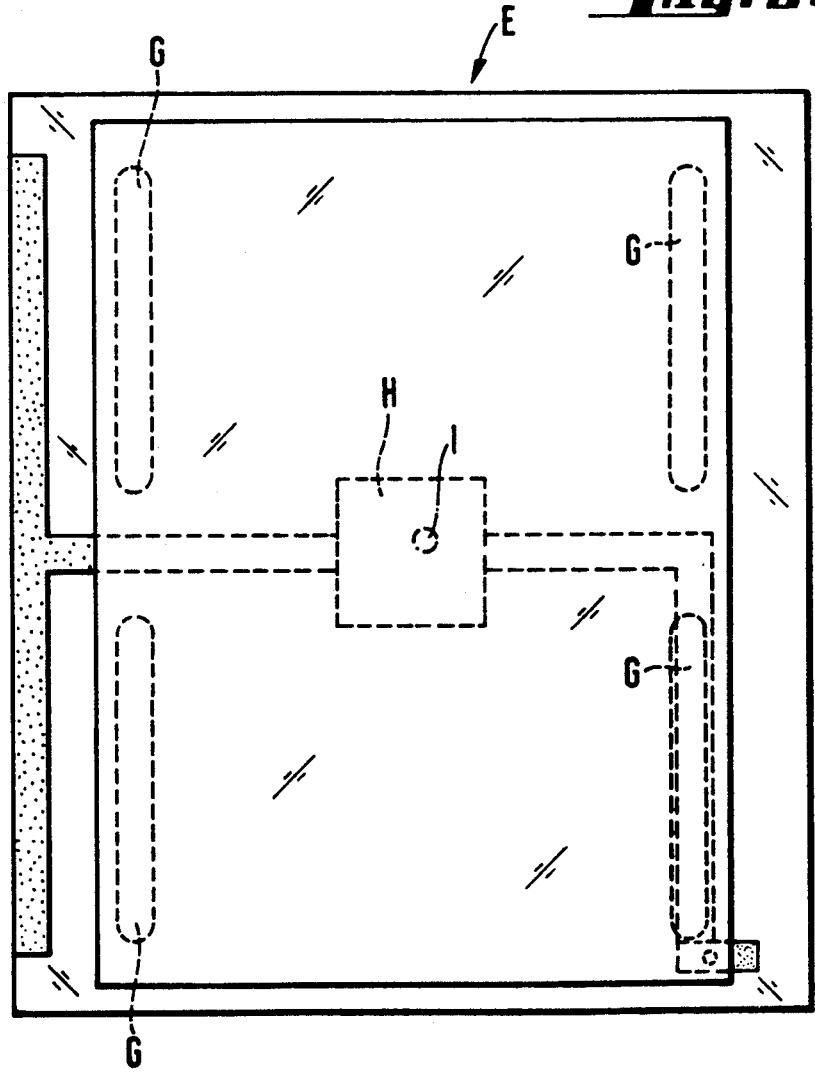

PROCESS FOR THE PRODUCTION OF AN IMPACT-RESISTANT LIQUID CRYSTAL SWITCHING AND DISPLAY DEVICE

BACKGROUND OF THE INVENTION

Switching and display devices containing ferroelectric liquid crystal mixtures ("FLC light valves") are known for example, from EP-B 0,032,362 (=U.S. Pat. No. 4,367,924). Liquid crystal light valves are devices which change their optical transmission properties, for example as a result of electrical switching, in such a manner that transmitted (and in some cases, again reflected) light is intensity-modulated. The known wrist watch and pocket calculator displays or liquid crystal displays in the areas of OA (office automation) or TV (television) are examples. These also include optical shutters, so-called "light shutters", such as are used, for example, in copying machines, printers, welding goggles, polaroid spectacles for three-dimensional viewing and the like. The application range of liquid crystal light valves also includes so-called "spatial light modulators" (see Liquid Crystal Device Handbook, Nikkan Kogyo Shimbun, Tokyo, 1989; ISBN 4-526-02590-9C 3054 and articles quoted therein).

The structure of the electrooptical switching and display devices is such that the FLC layer is enclosed on both sides by layers which usually contain, in the following order starting from the FLC layer, at least one orientation layer, electrodes and an outer sheet (e.g. made of glass). Moreover, they contain a polarizer, if they are operated in the "guest-host" or in the reflective mode, or two polarizers, if the transmissive birefringence mode is utilized. If desired, the switching and display elements can contain further auxiliary layers, such as, for example, diffusion barrier or insulating layers.

These types of orientation layers together with a sufficiently small spacing of the outer sheets bring the FLC molecules of the FLC mixture into a configuration at which the longitudinal axes of the molecules are parallel to one another and the smectic planes are arranged perpendicular or inclined to the orientation layer. In this arrangement, as is known, the molecules have two equivalent orientations between which they can be switched back and forth by applying a pulsed electric field, i.e. FLC displays are capable of bistable switching. The switching times are inversely proportional to the spontaneous polarization of the FLC mixture and are in the range of $\mu s$.

The main advantage of the FLC displays compared with the LC displays which up till now are still found in industrial practice for the most part is considered to be the attainable multiplex ratio, i.e. the maximum number of lines which can be addressed in a time-sequential process ("multiplex process"), which, in comparison with conventional LC displays is virtually unlimited in FLC displays. This electrical addressing is essentially based on the abovementioned pulse addressing described in SID 85 DIGEST p. 131 (1985) by way of example.

A known problem of FLC displays is the sensitivity of the orientation of the liquid-crystalline material in the liquid crystal layer to deformations caused by mechanical or thermal stress (see, for example, S. T. Lagerwall et al., Ferroelectrics 94, 3-65 (1989))—most often described by the term shock instability.

The root of this problem, which does not occur with nematic displays, resides in an intrinsic property of ferroelectric liquid crystals—the existence of the smectic layer structure. The high flow viscosity prevents spontaneous healing of defects of the appropriate layer structure caused by outside forces. In general, the original geometry can only be regenerated by heating the display to form the nematic or isotropic phase, which requires comparatively high temperatures and is technically complicated.

Since the shock instability is caused by the intrinsic properties of smectic liquid crystals described above, this has hitherto been considered a particularly serious problem.

Previous attempts at solving the shock problem have been based on avoiding possible deformations by constructing a more stable display structure (e.g. use of structured photoresist spacers (Leti, France))—or suspending the display in an elastic frame (CANON, Japan). The disadvantages of these displays are the higher manufacturing costs for such a display and the observation that strong forces nevertheless lead to a destruction of the smectic layers.

Surprisingly, it has now been found that by using switching and display devices containing an FLC mixture which contains a coronand or cryptand it is possible to bring the FLC material into a homogeneous "bookshelf" or "quasi bookshelf" geometry (see for these geometries Dübal et al., Proc. 6th Intl. Symp. on Electrets, Oxford, England 1988; Y. Sato et al., Jap. J. Appl. Phys. 28, L 483 (1989)). This structure is more resistant to the effect of deformation than the so-called "chevron geometry" which has tilted smectic layers.

SUMMARY OF THE INVENTION

Accordingly, the invention relates to a process for the production of a shock-resistant liquid crystal switching and display device in which two support plates, at least one of which has an orientation layer, are provided with at least one polarizer and a liquid-crystalline material is poured into the gap between the two support plates, in which the liquid-crystalline material used is a ferroelectric liquid crystal mixture containing at least one liquid-crystalline base component and furthermore at least one cryptand or coronand and a continuous periodic electric voltage is applied to the electrodes of the switching and display device before startup, until the liquid crystal layer adopts a "bookshelf" or "quasi-bookshelf" orientation.

The cryptands or coronands used are preferably the following compounds of the general formula (I) or (II):

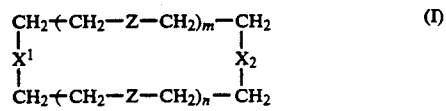

in which
—Z— is —O— or —S—,
m, n are integers greater than zero and m+n is 2 to 6,
—$X^1$—, —$X^2$—, identical or different, are

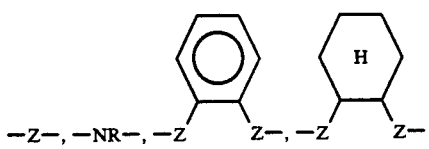

or —X¹—, —X²— together are

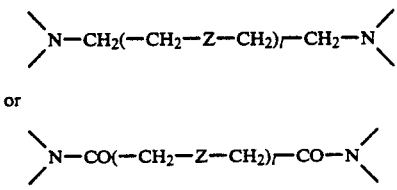

in which
— R is -alkyl or -alkanoyl of 1 to 15 carbon atoms, -phenyl, -benzyl or -benzoyl and
l is 1 or 2;

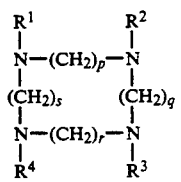 (II)

in which —R¹, —R², —R³ and —R⁴, independently of one another, are

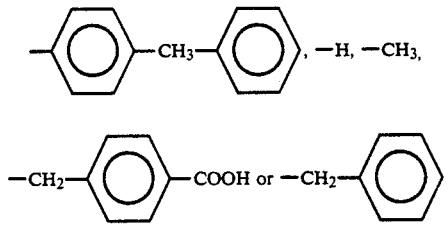

and p, q, r, s, independently of one another, are an integer from 2 to 4, in which p+q+r+s is 8 to 16.

Furthermore, those compounds of the formula (I) are preferably used in which
Z is an oxygen atom,
m, n are integers greater than zero and m+n is 2 to 4,
—X¹—, —X²—, identical or different, are

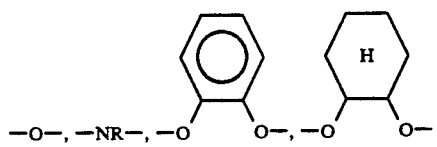

or —X¹—, —X²— together are

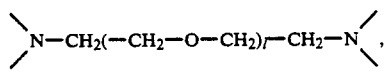

in which
—R is -alkyl or -alkanoyl of 1 to 15 carbon atoms, -phenyl, -benzyl or -benzoyl and
l is 1 or 2.

Of the compounds of the formula (II), those are preferably used in which $-R^1 = -R^2 = -R^3 = -H$ and $R^4$ is —H, ⌬, —CH₃; or —CH₂—⌬—COOH.

Preferably, 0.01 to 10 mol % of the compounds of the general formulae (I) and (II) are present in the FLC mixture. It is also preferred for the mixture to contain several different compounds of the general formula (I) and/or (II), the total content being, however, preferably 0.01 to 10 mol %.

To produce a "bookshelf" or "quasi-bookshelf" geometry, a periodic square voltage at a frequency of 1 to 1000 Hz and a field strength of 0.5 to 50 V/μm is preferably applied to the electrodes in the ferroelectric phase over a period of 0.1 second to 10 minutes. The greater the spontaneous polarization and the higher the temperature at which the field is applied, the higher the frequency and the smaller the field strength chosen.

An embodiment of the invention in which a periodic square voltage having a field strength of 5 to 20 V/μm and a frequency of 2 to 50 Hz is applied to the electrodes over a period of 1 second to 2 minutes is particularly preferred.

Furthermore, it is particularly preferred to apply the field by means of the periodic square voltage at the working temperature or in a narrow temperature interval (±10° C.) around the preferred working temperature.

A particular advantage of the process according to the invention is the fact that, by using the FLC mixtures mentioned, displays damaged by shock can nevertheless be restored to their initial state in a simple manner, from case to case or routinely, even during normal customer operation—simply by applying a suitable electric field for a short period of time.

In a particular embodiment of the invention, the switching and display device contains an additional (structural) element which allows or simplifies the routine application of the continuous periodic square voltage.

Accordingly, the invention also relates to a process for regenerating a shock-damaged liquid crystal switching and display device containing two support plates, at least one orientation layer, an adhesive frame, electrodes, at least one polarizer and a liquid-crystalline material and in which the liquid crystal layer was originally present (i.e. before the damage due to shock) in a "bookshelf" or "quasi-bookshelf" orientation, in which a liquid crystal layer composed of a ferroelectric liquid crystal mixture comprising at least one liquid-crystalline base component and furthermore at least one coronand or cryptand is used and a continuous periodic voltage is applied to the electrodes of the shock-damaged switching and display device.

For this purpose, it is also preferred to use the above-mentioned special FLC mixtures in the switching and display device. The voltage applied to the electrodes of the display damaged by freezing or shock is preferably a square voltage and preferably has a frequency of 1 to 1,000 Hz, in particular of 2 to 50 Hz and an electronic field strength of 0.5 to 50, in particular 5 to 20, V/$\mu$m.

To regenerate the display, the voltage is preferably applied for a period of 0.1 second to 10 minutes, in particular 1 second to 2 minutes. Applying a voltage for an extended period of time is not very advantageous for economic reasons.

A further problem in the application of ferroelectric liquid crystals in FLC displays consists in the fact that the minimum temperature at which these displays can be stored is too high, i.e. that, for example, low temperatures (such as can occur, for example, in an airplane) also lead, inter alia, to damage of the texture. If the liquid-crystalline material crystallizes in the display, the display loses its favorable switching properties after the remelting. The original switching behavior of the FLC display is only regenerated after heating it to form the cholesteric or isotropic phase and then cooling it to the working temperature.

In view of this fact, the process according to the invention, as already described above, turns out to be particularly advantageous. It has been found that frozen and remelted FLC displays filled with the FLC mixtures described above can be restored to the original favorable switching state (display a high contrast) even without heating it to temperatures above the working temperature range by applying a continuous periodic electric field for a short period of time.

The FLC light valves on which the process according to the invention is based contain a ferroelectric liquid-crystalline mixture (FLC mixture) which contains at least one coronand and/or cryptand.

Of the FLC light valves used in the process according to the invention, switching devices which are multiplex driven are preferred. Liquid crystal cells which operate in the SSFLC technique ("surface stabilized ferroelectric liquid crystal") and in which thd. Liquid crysts (i.e. spacing of the outer sheets) is 1 to 20 $\mu$m are particularly preferred. A cell thickness of 1 to 10 $\mu$m, in particular of 1.2 to 3 $\mu$m, is particularly preferred.

The FLC mixture preferably has an $S_C^*$ phase in the working temperature range and the phase transitions of the mixture are: I-N*-$S_A^*$-$S_C^*$ or I-N*-$S_C^*$.

BRIEF DESCRIPTION OF THE DRAWINGS

FIGS. 3a (a1)-(a5) are microscopic photographs of a cell containing coronands and/or cryptands.

FIGS. 3b (b1)-(b5) are microscopic photographs of the texture in the $\mp$chevron" geometry.

FIG. 5a is a side view of a test cell.

FIG. 5b is a top view of a test cell.

DETAILED DESCRIPTION OF THE PREFERRED EMBODIMENTS

The invention will be illustrated in more detail by Examples 1 to 4 below.

EXAMPLE 1

A liquid-crystalline basic mixture is prepared from the following 8 components (given in mol %):

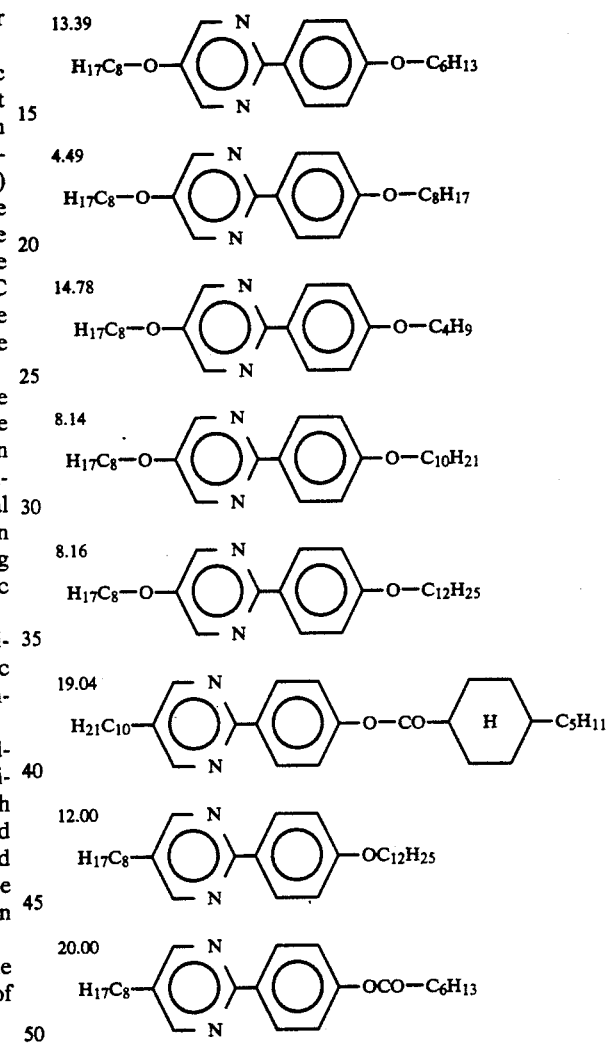

The mixture has the following phase transitions:

$S_C$ 71 $S_A$ 78 N 93 I.

The following compounds are used as chiral doping substances:

Doping substance D1

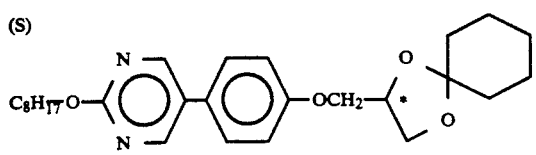

Doping substance D2

7

-continued

[Structure: C8H17O-pyrimidine-phenyl-O-CO-cyclopropane(R,R)-C3H7, cis]

Doping substance D3

[Structure: C8H17-pyrimidine-phenyl-O-CH2-cyclopropane(S,S)-C4H9, trans]

A comparison mixture (V) (for the tests which follow) has the following composition (in mol %):

| (V) | |
|---|---|
| Basic mixture | 87.67 |
| Doping substance D1 | 4.53 |
| Doping substance D2 | 2.70 |
| Doping substance D3 | 5.10 | and has the phase transitions $S_c^*$ 61 $S_A^*$ 69 $N^*$ 85 I at a spontaneous polarization of 30 $nC \times cm^{-2}$ at 25° C.

The two following compounds are used as coronand (C) and cryptand (CR):

[Structure (C): bicyclic coronand with O(-CH2)2-O-(CH2)2-O linkers between two cyclohexane rings]

[Structure (CR): cryptand structure with N-(CH2)2-O-(CH2)2-O-(CH2)2-N bridges]

Mixture X is prepared as an exemplary FLC mixture on which the process according to the invention is based and has the following composition (in mol %):

(X)

98.0 comparison mixture (V)
1.5 coronand (C)
0.5 cryptand (CR)

Mixture Y is prepared as a second FLC mixture containing a cryptand and/or coronand. It has the following composition (in mol %):

(Y)

14.6 [Structure: H17C8-pyrimidine-phenyl-O-C6H13]

9.7 [Structure: H17C8-pyrimidine-phenyl-O-C10H21]

8

-continued 13.1 [Structure: H17C8-pyrimidine-phenyl-O-C8H17]

9.1 [Structure: H17C8-O-pyrimidine-phenyl-O-C6H13]

4.2 [Structure: H17C8-O-pyrimidine-phenyl-O-C8H17]

9.6 [Structure: H17C8-O-pyrimidine-phenyl-O-C4H9]

7.7 [Structure: H17C8-O-pyrimidine-phenyl-O-C10H21]

14.4 [Structure: H25C12-pyrimidine-phenyl-O-CO-cyclohexane-C5H11]

5.7 [Structure: H17C8-pyrimidine-phenyl-O-CH2-cyclopropane(S,S)-C4H9]

3.4 [Structure: H17C8-O-pyrimidine-phenyl-O-CH2-epoxide-cyclohexane(S)]

6.5 [Structure: H17C8-O-pyrimidine-phenyl-O-CO-cyclopropane(R,R)-C3H7]

Coronand (C)   1.5
Cryptand (CR)  0.5

At a temperature of 25° C., it has a spontaneous polarization of 31 $nC \times cm^{-2}$ and has the following phase transitions:

X −3 $S_c$ 64 $S_A$ 72 N 83 I

EXAMPLE 2

The method described above of field-induced texture modification is applied to the mixture from Example 1 on which the process according to the invention is based and to the comparison mixture V.

A periodic square voltage with an amplitude of 25 volt and a frequency of 10 Hz is applied at room temperature to a 2 μm thick commercially available LC cell (manufactured by E.H.C. & Co., Ltd., Tokyo, Japan) containing polyimide rubbed parallel to the alignment direction (PIX 1400 from Hitachi Ltd., Tokyo, Japan) as orientation layer.

Figure 1A:
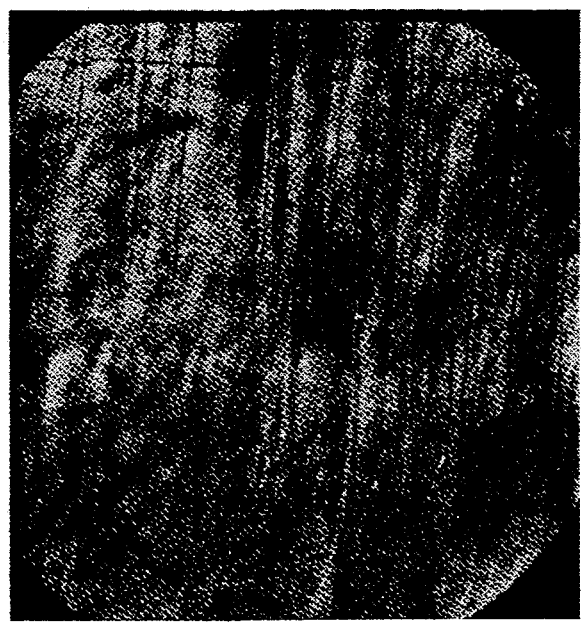
FIGS. 1a and 1b are microscopic photographs of the "quasi-bookshelf" geometry.
Figure 1B:
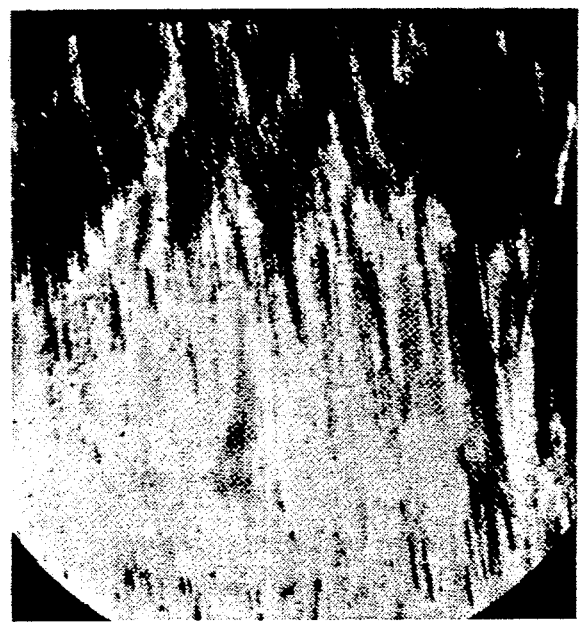
Figure 2A:
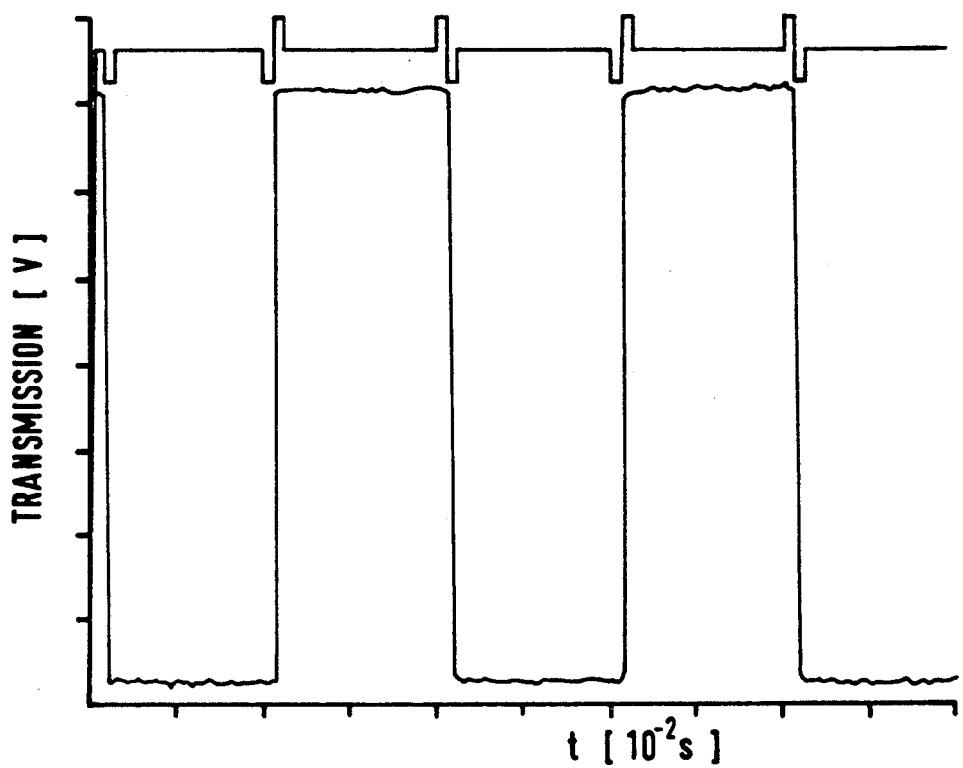
FIG. 2a is the transmission curve of mixture X.
Figure 2B:
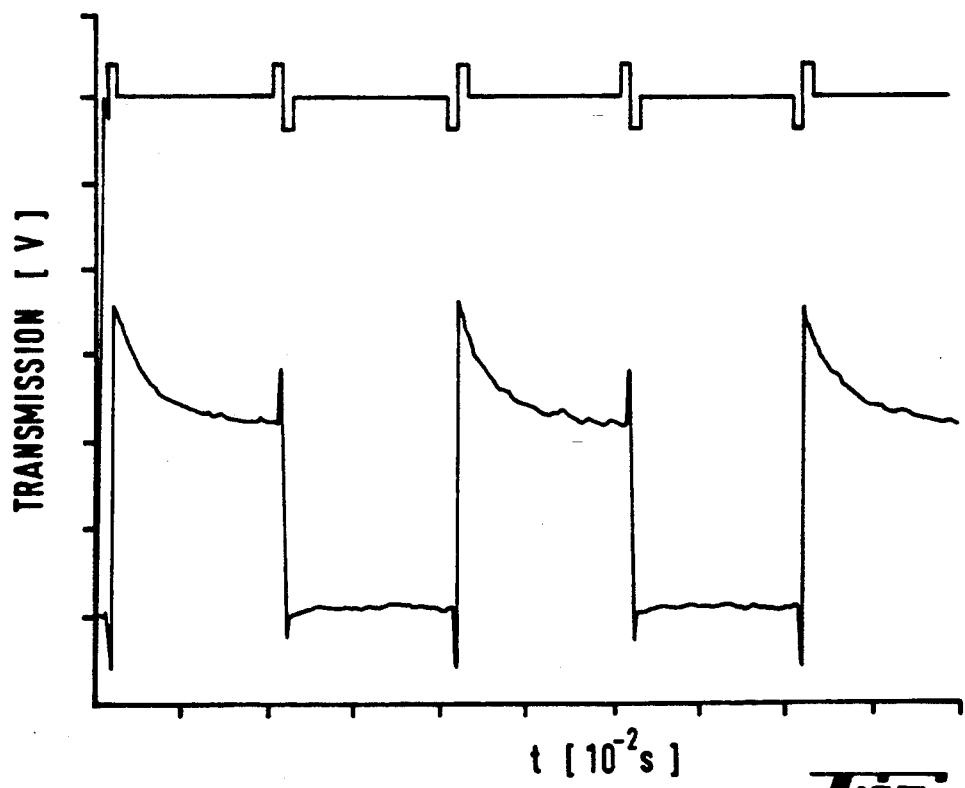
FIG. 2b is the transmission curve of the comparison mixture.

Microscopic photographs (magnification 125) of the resulting "quasi-bookshelf" geometry of the mixture X and the comparison mixture V are shown in FIG. 1a and FIG. 1b. In FIG. 1b, the macroscopically inhomogeneous texture and in FIG. 1a the microscopically characteristic stripe-like but macroscopically uniform texture can be clearly detected. Switching by means of bipolar pulses (such as is common in multiplex schemes) results in the optical transmission curves for the FLC mixture X and the comparison mixture shown in FIGS. 2a and 2b. The optical transmission was measured by placing the cell, as customary in SSFLC technology, between two crossed polarizers in a suitable manner. The high contrast (about 30:1) of mixture X (FIG. 2a) compares favorably with the low contrast (about 3:1) of the comparison mixture (FIG. 2b).

EXAMPLE 3

To demonstrate the special properties of the FLC mixtures used in the process according to the invention with respect to the possibility of regenerating a crystallized and remelted liquid crystal mixture (temperature-damaged switching and display device) by applying an electric field in such a manner that the original advantageous switching behavior (the high optical contrast) is again given, FLC mixtures X and Y and comparison mixture V described in Example 1 are each poured into liquid crystal cells having cell thicknesses of 2 μm and being provided with a 20 nm thick polyimide layer (as orientation layer). The cells are subjected to a continuous square voltage having a frequency of 10 Hz and an amplitude of 20 V for a period of 3 minutes.

The subsequent application of bipolar switching pulses (e.g. having a field strength of 8 V×μm$^{-1}$ and a pulse width of 0.5 msec) moves the director (orientation of the molecular axes), depending on the sign of the bipolar pulses employed, into two stable positions which are tilted to one another by a switching angle of 2 $\Theta_{eff}$. The cell is temperature-controlled at 25° C. and adjusted under a polarizing microscope in such a way that one of the two states has minimum transmission and the other switching state high transmission. The values of optical transmission listed in Table 1 refer to the maximum transmission of light through the FLC cell at a parallel position of the polarizers. In Table 1, the values given for the FLC mixtures listed in Example 1 containing coronands and cryptands show the high quality of the orientation in the dark state (low transmission, $T_d$) and the advantageously high switching angle (2 $\Theta_{eff}$), which leads to high transmission in the bright state (maximum transmission, $T_h$) (see Table 1, a).

After the thermal shock treatment (crystallization followed by remelting), both cells show a deterioration in transmission and thus in contrast (see Table 1, b).

Comparison between the two measurements in a and b shows that the contrast drops by values between 23 and 32%. A crucial advantage of the FLC mixtures which contain cryptands and coronands is that by again applying an electric field (as described above) the contrast in the cells can be increased. Comparison of measurement c with b shows that the contrast can now be increased by 24 to 29% due to the applied field and thus corresponds approximately to the contrast of the original cell (before crystallization of the FLC material).

A shock-damaged switching and display device containing an FLC mixture plus cryptand and/or coronand can thus be regenerated by applying a simple continuous alternating voltage in such a manner that the quality of the original device is restored.

TABLE 1

| Ex. No. | Cell thickness [μm] | Switching angle 2θ [°] | Relative light transmission Dark state $T_d$ | Light state $T_h$ | Contrast $T_h/T_d$ | Notes |
| --- | --- | --- | --- | --- | --- | --- |
| a | 1.30 | 50 | 1.1 | 70.9 | 64 | freshly aligned FLC cell (containing FLC mixture X) subjected to a field |
| b | 1.30 | 50 | 1.6 | 70.3 | 44 | same FLC cell after crystallization and remelting of the mixture |
| c | 1.30 | 50 | 1.2 | 70.1 | 58 | same FLC cell after crystallization, remelting and subjecting to a field |
| a | 1.31 | 46 | 0.79 | 76.3 | 96 | freshly aligned FLC cell (containing FLC mixture X) subjected to a field |
| b | 1.31 | 46 | 0.96 | 70.7 | 74 | same FLC cell after crystallization and remelting of the mixture |
| c | 1.31 | 46 | 0.67 | 70.7 | 105 | same FLC cell after crystallization, remelting and subjecting to a field |

EXAMPLE 4

The example which follows demonstrates on the one hand the higher shock resistance of the field-induced "quasi-bookshelf" geometry to mechanical deformation compared with the "chevron" geometry and on the other hand the possibility of healing a "quasi-bookshelf" geometry damaged by exposure to mechanical stress as a result of again applying a field.

For comparative investigation of the behavior of switching and display devices towards mechanical deformation, the commercially available test cell shown in FIGS. 5a and 5b (manufactured by E.H.C.) is filled with the mixture X according to the invention. The cell only has a spacer (G) in the adhesive frame (G) and therefore can easily be deformed by applying pressure in the middle of the cell. FIG. 5a shows a side view of the cell. FIG. 5b shows a top view of the entire cell (22×25 mm), in which the pressure point (I) and the switching panel (4×4 mm) (H) are given special emphasis.

Figure 6:
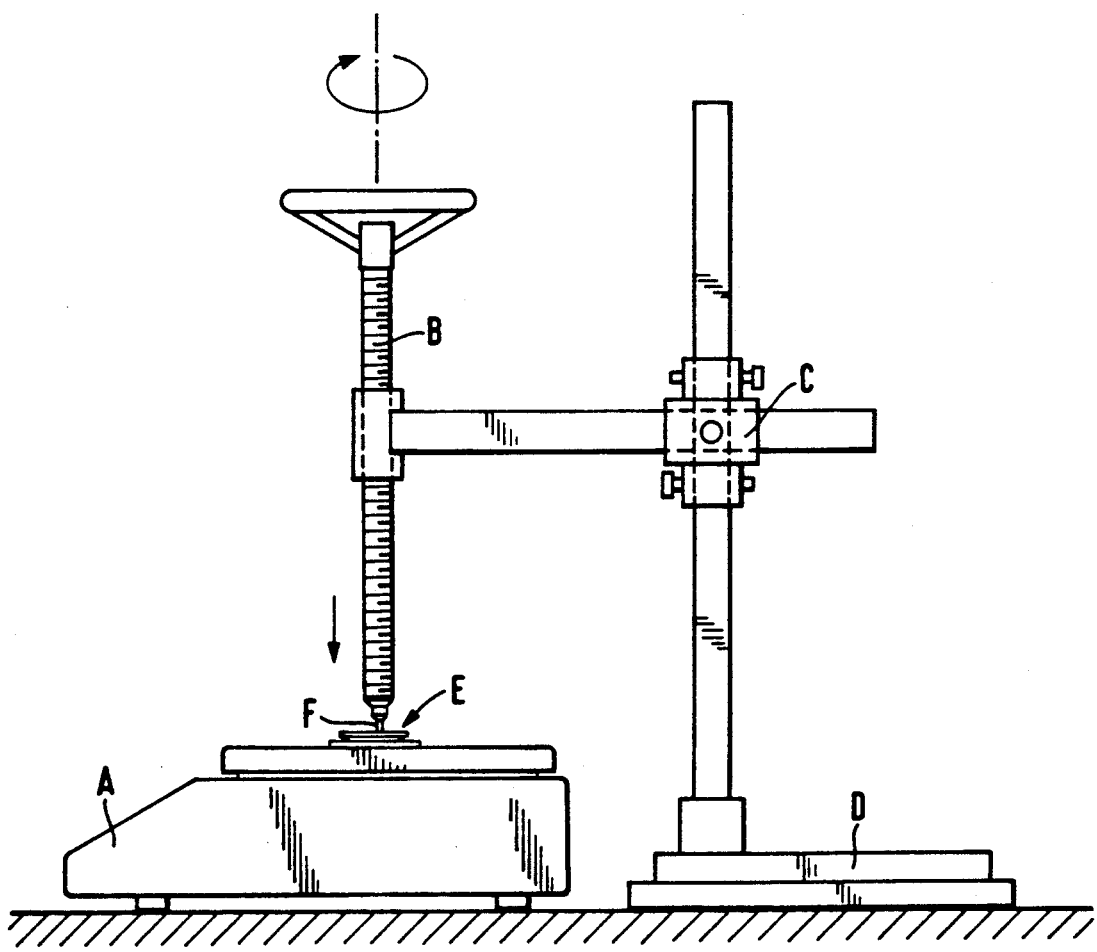
FIG. 6 is a cell compressed on a scale.

As shown in FIG. 6, the cell (E) is placed on a scale (A) and compressed by means of a screwed connection (B) attached to a stand (D) with a clamp (C) from above by means of a piston (F) of 1.5 mm in diameter for 10 seconds. The piston force is adjusted to a defined value and varied by means of the scale indicator. Before and after applying the load, texture and switching behavior of the cell are investigated under the microscope exactly below the pressure point (diameter=1.5 mm) (I).

FIG. 3b shows microscopic photographs of the texture in the "chevron" geometry in a magnification of 125 in the absence of load (b1) and after loads of various strengths (b2) to (b5); (b1=0 g; b2=200 g; b3=300 g; b4=400 g; b5=500 g).

In this case too, a change in texture is clearly visible after a load of 400 g. This is also obvious from the reduced contrast upon switching by means of bipolar pulses (see Table 2).

Regeneration of the original texture and the original contrast is only possible by converting it to the cholesteric or isotropic phase by heating, i.e. by applying high temperatures.

In contrast, if the device comprising a mixture containing coronands and/or cryptands is converted to a "quasi-bookshelf" geometry by applying an electric field, as described above, and the mechanical loading tests are then carried out, the photographs recorded with a magnification of 125 (FIG. 3a) show that substantial changes in the texture do only occur from a load of 600 g upwards (a1=0 g; a2=400 g; a3=500 g; a4=600 g; a5=1,000 g). This is also reflected in the contrast values listed in Table 3.

EXAMPLE 5

Figure 4A:
FIG. 4a is a microscopic photograph of a damaged cell.
Figure 4B:
FIG. 4b is a microscopic photograph of a regenerated cell.

An electric field is applied to the cell from Example 4 (see FIG. 3a (a5)) which was subjected to a load of 1,000 g (such as had been used before to convert the "chevron" geometry into the "quasi-bookshelf" geometry). The surprising finding is that even such a severely damaged cell (see FIG. 4a, corresponds to FIG. 3a (4b)) can be completely regenerated (FIG. 4b).

This is also confirmed by measuring the contrast, which showed, a contrast of 8:1 for the damaged cell (FIG. 4a) and a contrast of 75:1 for the regenerated cell.

Comparison with the contrast of the cell before applying the load (Table 3) shows that the cell can be completely regenerated, even with respect to its optical characteristic, by applying the field.

TABLE 2

| Contrast of a switching and display device after subjecting it to a load by means of a weight (in "chevron" geometry) | |
|---|---|
| Load (g) | Contrast |
| 0 | 13.4 |
| 100 | 13.3 |
| 200 | 13.7 |
| 300 | 13.7 |
| 400 | 10.5 |
| 500 | 10.0 |
| 600 | 9.8 |

TABLE 2-continued

| Contrast of a switching and display device after subjecting it to a load by means of a weight (in "chevron" geometry) | |
|---|---|
| Load (g) | Contrast |
| 700 | 7.2 |

TABLE 3

| Contract of a switching and display device after subjecting it to a load by means of a weight (in "quasi-bookshelf" geometry) | |
|---|---|
| Load (g) | Contrast |
| 0 | 68.0 |
| 200 | 67.7 |
| 300 | 67.7 |
| 400 | 71.1 |
| 500 | 73.0 |
| 600 | 11.1 |
| 700 | 11.0 |
| 800 | 9.4 |
| 1,000 | 8.0 |

We claim:

1. A process for producing a liquid crystal switching and display device which is shock-resistant and in which two connected support plates, at least one of which has an orientation layer, are provided with electrodes and at least one polarizer and a liquid-crystalline material is poured into the gap between the two support plates, wherein the liquid-crystalline material is a ferroelectric liquid crystal mixture containing at least one liquid-crystalline base component and furthermore at least one cryptand or coronand, which comprises applying a continuous periodic electric voltage to the electrodes of the switching and display device in the ferroelectric phase before startup, until the liquid crystal layer adopts a "bookshelf" or "quasi-bookshelf" orientation.

2. The process as claimed in claim 1, wherein the liquid crystal mixture used contains at least one cryptand or coronand of the general formula (I) or (II)

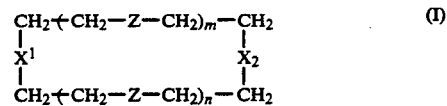

in which
—Z— is —O— or —S— and
m, n are integers greater than zero and m+n is 2 to 6,
—X$^1$—, —X$^2$—, identical or different, are

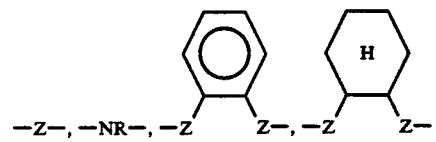

or —X$^1$—, —X$^2$— together are

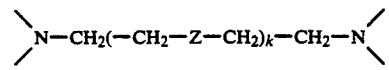

or

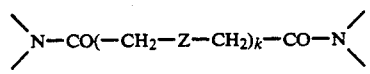

in which
— R is -alkyl or -alkanoyl of 1 to 15 carbon atoms, -phenyl, -benzyl or -benzoyl and
K is 1 or 2;

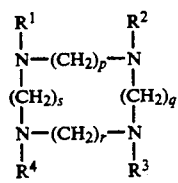
(II)

in which —$R^1$, —$R^2$, —$R^3$ and —$R^4$, independently of one another are,

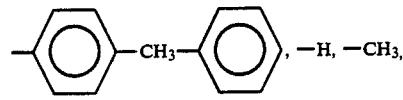

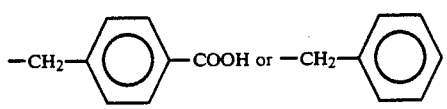

and p, q, r, s, independently of one another, are an integer from 2 to 4, in which p+q+r+s is 8 to 16,
and a periodic square voltage having a frequency of 1 to 100 Hz and a field strength of 0.5 to 50 V/μm is applied to the electrodes over a period of 0.1 second to 10 minutes.

3. The process as claimed in claim 2, wherein the liquid crystal mixture used contains a compound of the formula (I) in which
Z is an oxygen atom,
m, n are integers greater than zero and m+n is 2 to 4,
—$X^1$—, —$X^2$—, identical or different, are

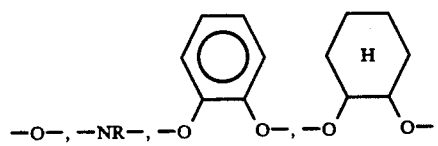

or
—$X^1$—, —$X^2$— together are in which
— R is -alkyl or -alkanoyl of 1 to 15 carbon atoms, -phenyl, -benzyl or -benzoyl and
K is 1 or 2.

4. The process as claimed in claim 2, wherein the liquid crystal mixture used contains a compound of the formula (II) in which
—$R^1$=—$R^2$=—$R^3$=—H and $R^4$ is —H,

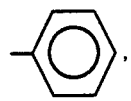

—$CH_3$ or

5. The process as claimed in claim 2, wherein a periodic square voltage having a field strength of 5 to 20 V/μm and a frequency of 2 to 50 Hz is applied to the electrodes over a period of 1 second to 2 minutes.

6. A process for regenerating a liquid crystal switching and display device which has been shock damaged and contains two support plates, at least one orientation layer, an adhesive frame, electrodes, at least one polarizer and a liquid-crystalline material, in which the liquid crystal layer was originally present in a "bookshelf" or "quasi-bookshelf" orientation, wherein the liquid crystal layer is a ferroelectric liquid crystal mixture containing at least one liquid-crystalline base component and furthermore at least one coronand or cryptand, which comprises applying a continuous periodic square voltage to the electrodes of the shock-damaged switching and display device.

7. The process as claimed in claim 6, wherein a periodic square voltage having a frequency of 1 to 1000 Hz and a field strength of 0.5 to 50 V/μm is applied to the electrodes over a period of 0.1 second to 10 minutes.

8. The process as claimed in claim 6, wherein a periodic square voltage having a frequency of 2 to 50 Hz and a field strength of 5 to 20 V/μm is applied to the electrodes over a period of 1 second to 2 minutes.

9. The process as claimed in claim 6, wherein the switching and display device contains an additional element which makes it possible to apply the continuous periodic square voltage in routine operation.

* * * * *